United States Patent
Forrest (10) Patent No.: US 11,465,236 B2
(45) Date of Patent: Oct. 11, 2022

(54) INTELLIGENT NON-AUTOGENOUS METALWORKING SYSTEMS AND CONTROL LOGIC WITH AUTOMATED WIRE-TO-BEAM ALIGNMENT

(71) Applicant: GM GLOBAL TECHNOLOGY OPERATIONS LLC, Detroit, MI (US)

(72) Inventor: John Forrest, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 602 days.

(21) Appl. No.: 16/583,782

(22) Filed: Sep. 26, 2019

(65) Prior Publication Data

US 2021/0094120 A1     Apr. 1, 2021

(51) Int. Cl.
| | | |
|---|---|---|
| *B23K 26/08* | (2014.01) | |
| *B23K 26/211* | (2014.01) | |
| *G05B 19/418* | (2006.01) | |
| *B23K 1/005* | (2006.01) | |

(52) U.S. Cl.
CPC ........ *B23K 26/0884* (2013.01); *B23K 1/0056* (2013.01); *B23K 26/211* (2015.10); *G05B 19/41875* (2013.01); *G05B 2219/45138* (2013.01); *G05B 2219/49015* (2013.01)

(58) Field of Classification Search
None
See application file for complete search history.

(56) References Cited

U.S. PATENT DOCUMENTS

| 4,684,779 A | 8/1987 | Berlinger et al. |
| 5,371,337 A | 12/1994 | Campbell et al. |
| 6,646,225 B1 | 11/2003 | Wang et al. |
| 8,089,027 B2 | 1/2012 | Newman et al. |
| 8,258,432 B2 | 9/2012 | Narayanan |
| 2006/0070986 A1* | 4/2006 | Ihde ................ B23K 9/1336 219/137.71 |
| 2010/0053417 A1 | 3/2010 | Baxansky |
| 2015/0189154 A1 | 7/2015 | Laroia et al. |
| 2016/0263710 A1* | 9/2016 | Yoshida ............. B23K 9/133 |
| 2018/0046062 A1 | 2/2018 | Fisher et al. |
| 2018/0239331 A1 | 8/2018 | Forrest et al. |
| 2019/0099830 A1 | 4/2019 | Smith et al. |

* cited by examiner

*Primary Examiner* — Sean Shechtman
(74) *Attorney, Agent, or Firm* — Quinn IP Law (57) ABSTRACT

Presented are intelligent non-autogenous metalworking systems and control logic for automated wire-to-beam alignment, methods for making/using such systems, and robot-borne laser welding/brazing heads with closed-loop control for real-time wire alignment. A method for controlling operation of a non-autogenous workpiece processing system includes a system controller receiving sensor signals from a position sensor indicative of a location of filler wire discharged into a joint region by a wire feeder. Using the received sensor signals, the controller determines a displacement between the wire location and a location of a beam emitted onto the joint region by a beam emitter. If the wire displacement is greater than a threshold wire displacement value, the controller responsively determines a corrective force calculated to reduce wire displacement to below the threshold wire displacement value. The controller then commands the actuator to pivot the processing head to thereby apply the corrective force to the discharging filler wire.

20 Claims, 3 Drawing Sheets

INTELLIGENT NON-AUTOGENOUS METALWORKING SYSTEMS AND CONTROL LOGIC WITH AUTOMATED WIRE-TO-BEAM ALIGNMENT

INTRODUCTION

The present disclosure relates generally to metalworking techniques for joining or repairing workpieces. More specifically, aspects of this disclosure relate to systems, methods, and devices for automated wire-to-beam alignment in welding/brazing processes.

Welding is a fabrication and repair process that bonds materials, usually metals or thermoplastics, by causing coalescence—the process by which two separate units or adjacent sections of a single unit grow together, fuse, or merge into a single body/section. In a joining operation, for example, two workpieces are juxtaposed oftentimes in abutting side-by-side relation, and then fused together by liquefying or plasticizing (softening without liquefying) the areas to be bonded together. Workpiece liquefaction/plasticization may be achieved through the application of heat, electric arc, electron beam, ultrasound, pressure, friction, or any combination thereof. For non-autogenous welding techniques, a filler material is added and melted to form a localized pool of molten material (a "weld puddle"). Promoting coalescence of the liquefied or plasticized materials, and subsequently allowing the coalesced materials to cool will solidify the bond. Welding can be used, for example, to permanently join two or more workpieces, to operate on a single workpiece (e.g., to repair a crack or join two segments), and to cut or pierce workpieces.

Brazing is an alternative joining process traditionally applied to workpieces of dissimilar metals or to engineered ceramics. Brazing uses a filler material ("braze alloy") with a lower melting temperature than that of the base materials; by using a lower-melting-temperature filler, brazing distinguishes from welding by not melting the underlying parent workpiece(s). Rather, the filler material is heated to a working temperature that is slightly above its melting point, yet well below the melting temperature of the parts being joined, then allowed to flow into the joint region and cool to form the final bond. In order to achieve a sound brazed joint, the base and filler materials should exhibit material compatibility, and the joint region should incorporate a narrowed gap into which the molten filler is drawn and distributed by capillary action. The dimensions of the joint gap may be dependent on many factors, including manufacturing tolerances, design constraints, brazing atmosphere, and the composition of the base material and braze alloy.

While there are innumerable techniques available for joining and repairing workpieces, many modern-day manufacturing facilities employ laser beam brazing and welding processes to join workpieces. In automotive applications, for example, a robot-borne brazing/welding head implements a high-voltage gas or solid-state laser to melt a braze alloy filler wire that is continuously fed into a joint gap between the sheet-metal panels of an automobile body. To safeguard the structural integrity of the joint, the wire feed is accurately positioned with respect to the joint region to ensure that a majority of the molten filler flows into the joint gap. Historically, the laser brazing/welding head had to be manually calibrated in an offline, feedforward procedure to accurately position the laser beam and wire feeder over the metal workpieces. This is an intensive, time-consuming process for the machine operator that typically necessitates the use of complex equipment, such as a specialized pilot laser or a dedicated calibration unit. In addition, many existing calibration procedures do not account for reaction forces applied to the filler wire during the welding/brazing process due to part variations and changes in operating environment.

SUMMARY

Presented herein are intelligent non-autogenous workpiece processing systems with attendant control logic for provisioning automated wire-to-beam alignment, methods for making and methods for using such systems, and robot-borne laser welding/brazing heads with closed-loop control for real-time wire alignment. By way of example, and not limitation, there are presented welding/brazing methods for providing in-process alignment of the laser beam and wire feed by means of image processing and corrective side forces applied to the filler wire. The workpiece processing system uses precision computer vision and closed-loop feedback control to adjust the positioning of the filler wire through a built-in servomotor that selectively pivots the laser head. Edge-detection software locates the lateral edge of the feed wire; using this data, a compensation engine calculates a wire-to-beam displacement, assesses the severity of the displacement and, if necessary, calculates a corrective side force to offset the displacement based on the filler wire's spring constant and a wire-to-beam displacement error. A system controller modulates servomotor output to rotate the laser head and thereby apply the corrective side forces to the filler wire.

Attendant benefits for at least some of the disclosed concepts include automated, real-time wire-to-beam alignment during a brazing/welding operation that minimizes manual calibration and correction of the workpiece processing system. During the braze/weld process, the feed of filler wire tracks the joint seam; a resultant reaction force is applied by the joint to the wire, potentially pushing the wire out of alignment with the laser beam. Disclosed systems, methods, and devices offset this reaction force by applying corrective forces to the filler wire via the rotatable laser head. This, in turn, minimizes setup time and manual labor, reduces manufacturing time and related costs, and improves the strength and integrity of the weld/braze seam. Additional benefits may also include compensating for equipment degradation, counteracting operator errors introduced during manual calibration, and extending the time between manual checks/adjustments. Disclosed systems, methods, and devices may be incorporated into laser-based and non-laser-based workpiece processing systems, implemented for any logically relevant type of joining, fabrication, and repair processes, utilized for metallic and non-metallic workpieces, and employed for automotive and non-automotive applications alike.

Aspects of this disclosure are directed to methods for manufacturing and methods for controlling any of the disclosed systems and devices. In an example, a method is presented for governing operation of a non-autogenous workpiece processing system. The workpiece processing system includes a resident or remote system controller, a pivotable processing head, and an actuator operable to selectively pivot the processing head. Mounted on the processing head is a wire feeder operable to discharge filler wire, and a beam emitter operable to melt the filler wire. This representative method includes, in any order and in any combination with any of the above and below disclosed options and features: receiving, via the system controller from a position sensor, sensor signals indicative of a wire location of the filler wire discharged into a joint region by the wire feeder; determining, via the system controller based on the received sensor signals, a wire displacement between the wire location and a beam location of a beam emitted onto the joint region by the beam emitter; determining, via the system controller, if the wire displacement is greater than a threshold wire displacement value; determining, via the system controller responsive to the wire displacement being greater than the threshold wire displacement value, a corrective force calculated to reduce the wire displacement to below the threshold wire displacement value; and transmitting, via the system controller to the actuator, one or more command signals to pivot the processing head to thereby apply the corrective force to the filler wire as the filler wire is discharged from the wire feeder.

Additional aspects of this disclosure are directed to welding/brazing systems with attendant control logic for provisioning automated wire-to-beam alignment. In an example, there is presented an automated non-autogenous workpiece processing system for joining, repairing, etc., one or more workpieces. The workpiece processing system includes a processing head with a support frame that pivotably mounts to a support structure, such as an articulating robot arm. A wire feeder is mounted on the support frame and operable to discharge a continuous feed of filler wire. In addition, a beam emitter is mounted on the support frame and operable to emit a beam that melts the discharged filler wire. An actuator, which may be in the nature of a controller-activated servomotor, is drivingly attached to the support frame and operable to selectively pivot the processing head.

Continuing with the discussion of the above example, the workpiece processing system also includes a system controller, which may be embodied as an electronic control unit or a network of distributed controllers or control modules that regulate operation of one or more resident processing systems. The system controller is programmed to receive, from one or more position sensors, sensor signals indicative of the discharged filler wire's location, and determine, based on these signals, a wire displacement between the wire's location and a location of the beam emitted onto the joint region by the beam emitter. The system controller then assesses whether or not the wire displacement exceeds a threshold displacement value; if so, the controller responsively calculates, retrieves, estimates, and/or ascertains (collectively "determines") a corrective force that will reduce the wire displacement to below the threshold displacement value. The system controller then commands the actuator to pivot the processing head such that the processing head applies the corrective force to the filler wire as the filler wire is discharged from the wire feeder.

Additional aspects of the present disclosure are directed to techniques, algorithms, and logic for operating or manufacturing any of the disclosed systems, workpieces, and devices. Aspects of the present disclosure are also directed to laser welding/brazing robot architectures and automated or autonomous control systems for provisioning automated wire-to-beam alignment. Also presented herein are non-transitory, computer readable media storing instructions executable by at least one of one or more processors of one or more programmable control units, such as an electronic control unit (ECU) or control module, to govern operation of a disclosed system or device.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example.

Figure 1:
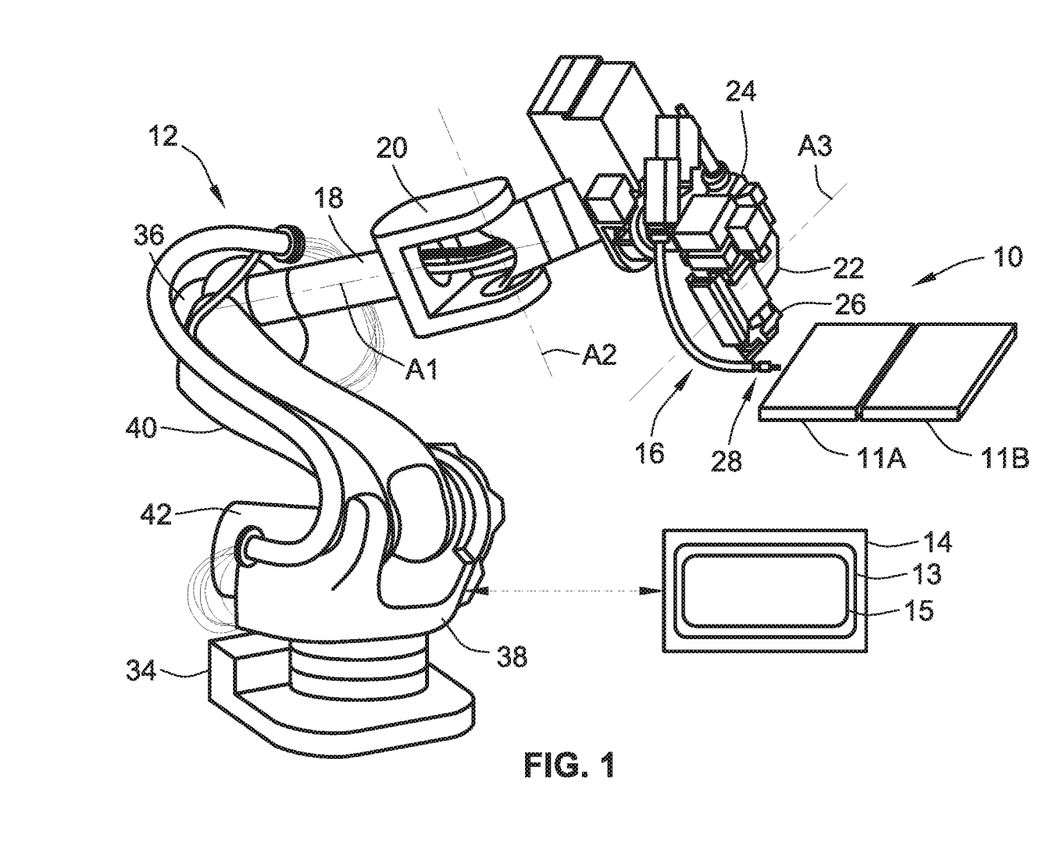
FIG. 1 is an elevated, perspective-view illustration of a representative non-autogenous workpiece processing system with automated wire-to-beam alignment capabilities in accordance with aspects of the present disclosure.

Referring now to the drawings, wherein like reference numbers refer to like features throughout the several views, there is shown in FIG. 1 an illustration of a representative non-autogenous workpiece processing system, which is designated generally at 10 and portrayed herein for purposes of discussion as a robotic laser beam welding (LBW) cell. The illustrated robotic LBW cell 10—also referred to herein as "workpiece processing system" or "metalworking system"—is merely an exemplary application with which novel aspects and features of this disclosure may be practiced. In the same vein, incorporation of the present concepts into laser welding processes should also be appreciated as an exemplary implementation of the novel concepts disclosed herein. As such, it will be understood that aspects of the present disclosure may be incorporated into other robotic and non-robotic weld system architectures, and may be implemented for any logically relevant type of non-autogenous workpiece processing operation, i.e., fabrication and repair techniques that employ a heat-liquefied filler or solder material. In addition, the systems, methods, and devices provided herein can be employed for operating on a single workpiece, for joining together two or more workpieces, or for joining together two segments of a single workpiece. Lastly, the drawings presented herein are not necessarily to scale and are provided purely for instructional purposes. Thus, the specific and relative dimensions shown in the drawings are not to be construed as limiting.

Robotic LBW cell 10 of FIG. 1 is generally represented in the drawings by a free-standing, computer-automated robot 12 that communicates, e.g., wired or wirelessly, with an electronic robot weld controller ("system controller") 14 that governs operation of the robot 12. An end effector, portrayed herein as a laser welding head 16 ("processing head"), is attached to the robot 12 to allow the robot 12 to perform one or more tasks on a single workpiece 11 (FIG. 2) or multiple workpieces 11A and 11B (FIG. 1), including but not limited to welding, brazing, cutting, assembling, adjusting, and/or inspecting parts. As will be described in further detail hereinbelow, the laser welding head 16 is designed to selectively complete one or more welding operations along one or more weld joint regions of one or more workpieces 11. Movement of the robot 12 may be provided by means of servomotors, linear and rotational transducers, pneumatic actuators, hydraulic actuators, or by any other type of logically applicable actuation mechanism. In the same vein, the robot 12 may have six degrees of freedom of motion, as shown, or have any other suitable number of degrees of freedom of motion.

In the illustrated example, the laser welding head 16 is mounted to a robot arm 18 in a repositionable and re-orientable manner. In the figure, denoted at 20 is a mechanical joint—more commonly referred to as a "robot wrist"—for movably mounting the laser welding head 16 to the robot arm 18 in a pivotable and rotatable manner. For example, the laser welding head 16 is operable to rotate about a first axis A1 extending longitudinally through the center of the robot arm 18, and pivot about a second axis A2 extending transversely through a center coupling of the robot wrist 20. The laser welding head 16 also includes a support frame 22 adjacent the robot wrist 20 at which the weld head 16 pivotably mounts to the robot 12 for guided movement of the weld head 16 to carry out a predetermined welding operation. An electronic actuator, which is portrayed in FIG. 1 as a controller-activated electric servomotor 24 fixed adjacent to the support frame 22, is operable, e.g., via robot weld controller 14, to pivot the laser welding head 16 about a third axis A3 extending lengthwise through a pivot coupling of the support frame 22.

With continuing reference to FIG. 1, a stationary base 34 operatively supports the robot 12 and, thus, the laser welding head 16. The robot 12 is shown as a freestanding apparatus, e.g., with the base 34 seated on and fixed to a factory floor. However, it should be appreciated that the base 34 and, thus, the robot 12 can be mounted at various other locations in a variety of different manners, including, but not limited to, a factory wall, ceiling, support truss, wheeled base, etc., without departing from the scope of this disclosure. An articulating joint assembly 36 is movably mounted on the base 34 for a swivel movement about a vertical axis via a swivel frame 38 and support post 40. The swivel movement of the robot 12 is produced, for example, by means of a robot swivel servomotor 42 or other servomechanism that is provided on the swivel frame 38. The controller 14 is programmed, at least in part, to control the automation of the robot 12, including movement of all corresponding robot components. By way of example, the controller 14 regulates the swiveling of swivel frame 38 on the base 34, the pivoting of support post 40 on the swivel frame 38, articulation of robot arm 18 with respect to the support post 40, and the rotating and pivoting of laser welding head 16 via the robot wrist 20. Robot weld controller 14 is also programmed to control the selective welding operations of the laser welding head 16, including the pivoting movement of the head 16 on support frame 22 and corresponding activation and deactivation of a high-intensity laser 26 ("beam emitter") and a wire feeder 28 borne by the laser welding head 16.

As indicated above, robot weld controller 14 is constructed and programmed to automate, among other things, the movement and operation of the robot 12 and laser welding head 16. Control module, module, controller, control unit, electronic control unit, processor, and any permutations thereof may be defined to include any one or various combinations of one or more of logic circuits, Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), shown schematically at 13 in FIG. 1, whether resident, remote or a combination of both, store processor-executable software, firmware programs, routines, etc., which are collectively represented at 15.

Software, firmware, programs, instructions, routines, code, algorithms, and similar terms may be used interchangeably and synonymously to mean any processor-executable instruction sets, including calibrations and look-up tables. The system controller 14 may be designed with a set of control routines and logic executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing use or operation of the system 10.

Figure 2:
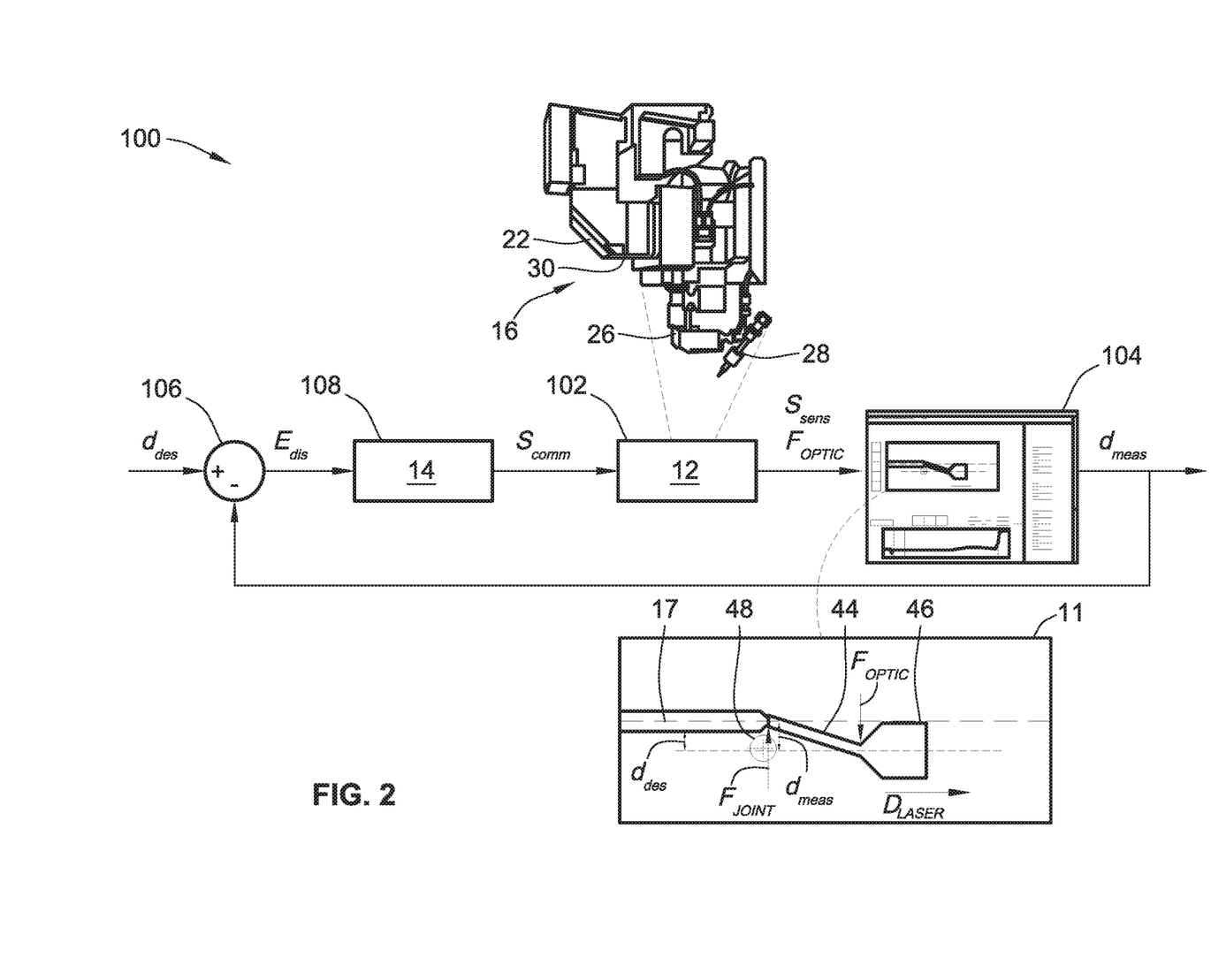
FIG. 2 is a schematic process-flow diagram illustrating a representative closed-loop control sequence for real-time filler wire displacement adjustment during a laser welding/brazing operation in accordance with aspects of the present disclosure.

As shown in FIG. 2, the laser welding head 16 carries a high-precision digital camera 30 (e.g., SCANSONIC AL03® Laser Processing Optic) operable to capture, among other things, real-time digital images of the workpiece(s) 11, a joint region 17 on a workpiece 11 or between multiple workpieces 11A, 11B, a filler wire 44 ejected through a feeder nozzle 46 at the end of the wire feeder 28, and a laser beam 48 emitted onto the joint region 17 by the high-intensity laser 26. This digital camera 30 operates as a sensing device within a monitoring system that is integrated into laser welding head 16 and includes an actuator-driven autofocus device and a multifocal module for controller operation of the autofocus device. The digital camera 30 senses one or more objects and generates feedback data, detects respective locations of select sites with respect to each object, and subsequently sends location image signals back to an image recognition module 104 (e.g., LESSMU-ELLER WELDEYE® Image Processing Software), which may be discrete from or integrated into the robot weld controller 14. The motorized autofocus device provides systematic precision focus upon the objects and displacement between designated sites, e.g., by being adjusted to be closer to and farther from each object/site. These sites may also be embodied as burn points etched unto the surface of the workpiece 11 through the laser beam 48 from laser welding head 16.

In the control loop 100 of FIG. 2, an initial system setup is carried out on the robotic LBW cell 10 through a suitable human machine interface (HMI) 102, including powering on the laser welding head 16, and calibrating a laser spot location ("beam location") of the laser beam 48 (shown as a crosshair in the inset view of FIG. 2) once on camera. Initial system setup may further necessitate setting into cache memory of the resident software engine a desired beam-to-wire displacement value $d_{des}$ between the laser spot location and a wire location of a distal end of the filler wire 44. Additional control commands, tolerances, and parameters may be entered at this juncture prior to commencement of a desired metalworking operation. During a weld/braze process, camera 30 captures real-time digital images of the weld region 17, as seen for example in the inset view of FIG. 2. These digital images are transferred as sensor signals $s_{sens}$ to the image recognition module 104, which implements image detection and processing software code segments to detect an inboard edge of wire 44.

Once the location of the wire 44 is derived, the image recognition module 104 measures a displacement $d_{meas}$ from the calibrated laser spot to the edge of wire 44. Detected displacement $d_{meas}$ is transferred to a difference selector module 106 and compared against the memory-stored desired displacement value $d_{des}$. A positive displacement error $E_{dis}$, calculated as a mathematical difference between the detected displacement $d_{meas}$ and the desired displacement value $d_{des}$, is fed into a system controller 14 at control loop operation 108. The controller 14 calculates a corrective force value $F_{OPTIC}$ that will reduce the positive displacement error, e.g., down to zero (0). One or more corresponding command signals $s_{comm}$ are transmitted to the servomotor 24, which responsively pivots the laser welding head 16 such that the weld head's feeder nozzle 46 applies the corrective side force $F_{OPTIC}$ to the filler wire 44 as the wire 44 is discharged from the wire feeder 28. Image processing may detect a new displacement of edge of wire and repeat all subsequent operations to maintain beam-to-wire alignment.

Figure 3:
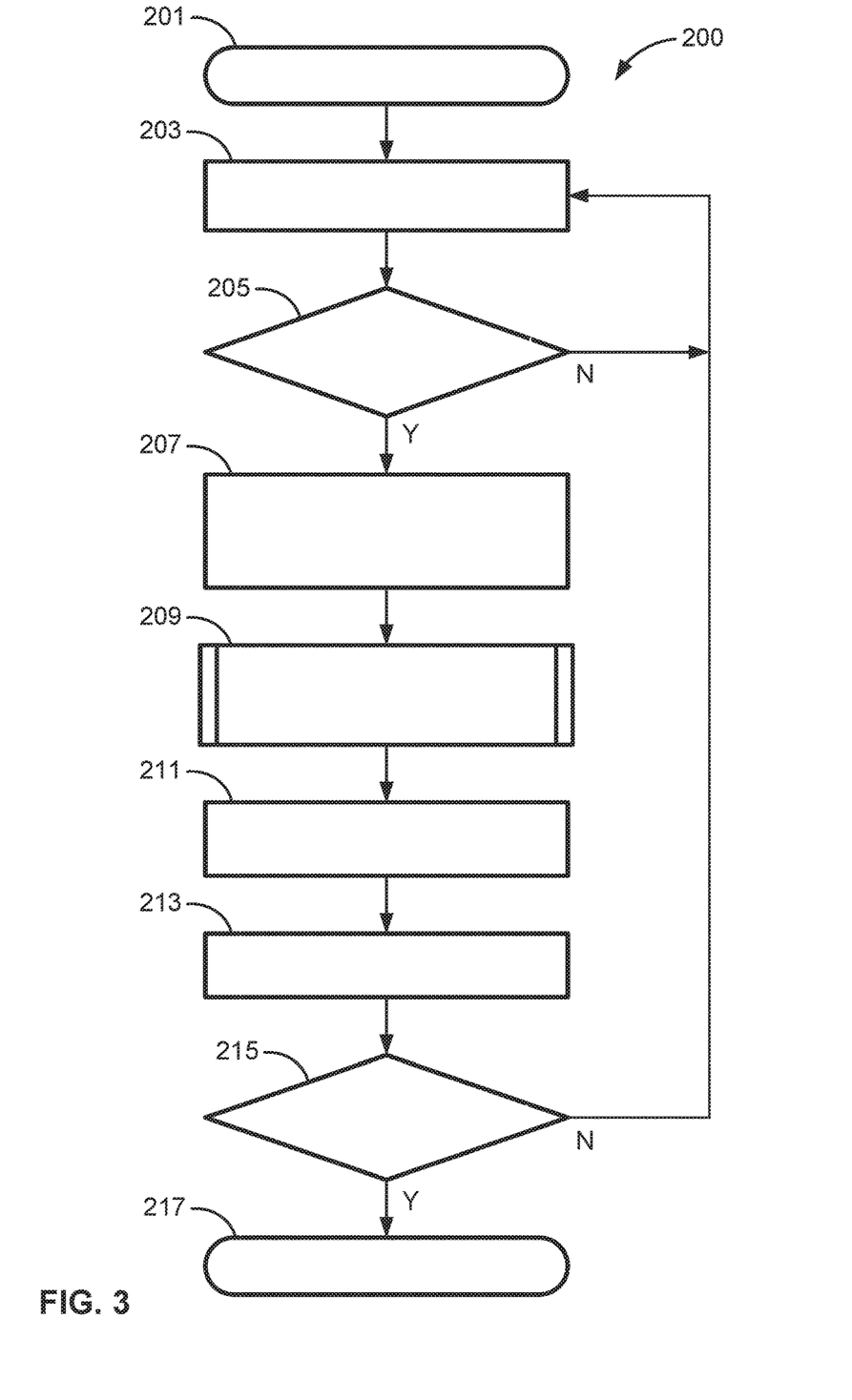
FIG. 3 is a flowchart illustrating a representative welding/brazing protocol for provisioning automated wire-to-beam alignment, which may correspond to memory-stored instructions executed by a controller, control-logic circuitry, programmable electronic control unit, and/or network of devices in accord with aspects of the disclosed concepts.

With reference next to the flow chart of FIG. 3, an improved method or control strategy for automating wire-to-beam alignment of a heat-liquefied filler or solder material, such as filler wire 44 of FIG. 2, through modulated movement of a pivotable processing head, such as laser welding head 16, is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or off-board controller, processing unit, control logic circuit, or other module or device or network of modules/devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at terminal block 201 of FIG. 3 with processor-executable instructions for a programmable controller or control module or similarly suitable processor to call up an initialization procedure for a closed-loop control sequence with real-time filler wire displacement adjustment during a welding/brazing operation. This routine may be executed in real-time, continuously, systematically, sporadically, and/or at regular intervals, for example, each 100 milliseconds, during active operation of the robotic LBW cell 10 of FIG. 1. As yet another option, block 201 may initialize in response to a user prompt from a system operator or technician of the robotic LBW cell 10, or responsive to a broadcast prompt signal from a backend server-class computer or middleware computing node tasked with governing operation of a robotic cell, collection of robot cells, or a manufacturing facility incorporating therein one or more robot cells. To carry out this protocol, a welding/brazing control system or any combination of one or more subsystems may be operable to receive, process, and synthesize pertinent information and inputs, and execute control logic and algorithms to regulate various subsystems and/or subsystem components to achieve desired control targets. As part of initiating the welding/brazing operation at terminal block 201, a series of command signals may be transmitted by robot weld controller 14 to electric servomotor 24 to pivot the processing head 16 in accordance with a predefined sequence of clockwise and/or counterclockwise angular distances. In this regard, command signals sent to the servomotor 24 in order to offset reaction force applied by the joint region 17 to the filler wire 44 is supplementary to—adds to or subtracts from—the angular distances of the processing head 16 carried out as part of the normal welding/brazing operation.

Advancing from terminal block 201 to process block 203, the method 200 of FIG. 3 provides memory-stored instructions for a non-autogenous workpiece processing system to determine a location of a filler wire discharged from a processing head's wire feeder during a workpiece processing operation. In accord with the illustrated example, the robot weld controller 14 of FIG. 1 receives from a position sensor one or more sensor signals indicative of a location of a distal end of the filler wire 44 discharged into the joint region 17 through the wire feeder nozzle 46. As indicated above, the position sensor may be embodied as a digital camera module, such as high-precision digital camera 30 of FIG. 2, that is integrated into the laser welding head 16 and operable to capture real-time images of the discharged filler wire 44. In this regard, the sensor signals received by the robot weld controller 14 may include data files with the captured images of the wire 44. Using these sensor signals, the controller 14 ascertains, alone or in cooperation with image recognition module 104 of FIG. 2, a lateral edge of the filler wire 44. Once identified, the location of the lateral edge may be set into cache memory as the wire's location. It is also plausible for the weld controller 14/image recognition module 104 to ascertain from these captured images a beam center of the laser beam 48 (e.g., the center of the crosshair in FIG. 2), which may be set into cache memory as the beam's current location.

Method 200 thereafter proceeds from process block 203 to decision block 205 to determine a wire displacement between the wire location and the beam location, and concomitantly ascertain whether or not this displacement exceeds a threshold wire displacement value. After locating the respective positions of the discharged wire 44 and emitted laser beam 48, the system controller 14 is able to measure a wire displacement value $d_{meas}$ as the distance between the lateral edge of the distal end of the wire 44 and the beam center of the laser beam 48. A displacement error $E_{dis}$ is then calculated as the mathematical difference between the measured displacement $d_{meas}$ and the desired displacement value $d_{des}$. This displacement error $E_{dis}$ will be a positive non-zero number if the measured displacement $d_{meas}$ is in fact greater than the desired displacement value $d_{des}$.

For some implementations, the workpiece processing system may be calibrated with a threshold range delineated by a first (high) threshold displacement value at an upper end thereof and a second (low) threshold displacement value at a lower end of the range (e.g. 0.8 mm+/−0.1 mm). In this instance, decision block 205 determines: (1) whether or not the wire displacement $d_{meas}$ is greater than the high threshold displacement value (e.g., 0.9 mm); and, if not, (2) whether or not the wire displacement $d_{meas}$ is greater than the low threshold displacement value (e.g., 0.7 mm). If the wire's edge is detected outside of the HIGH limit for 25 frames, for example, a digital output may be pulsed for 100 ms. If, however, the wire's edge is detected outside of the LOW limit for 25 frames, a second digital output may be pulsed for 100 ms. As explained below, system response may be tailored to the severity of the wire displacement as compared to the system-calibrated threshold range. If the detected wire displacement does not exceed the threshold wire displacement (Block 205=NO), method 200 may loop back to process block 203.

Upon determining that the detected wire displacement does exceed the threshold wire displacement (Block 205=YES), method 200 advances to process block 207 and feeds the displacement error $E_{dis}$ and desired displacement value $d_{des}$ into the robot weld controller 14. Using this data, the system controller executes the instructions of predefined process block 209 and calculates a corrective force that will reduce the wire displacement to below the threshold wire displacement value (i.e., drive the displacement error $E_{dis}$ to zero. This corrective force may be estimated using suitable filler wire dynamics modeling software, retrieved from a memory-stored lookup table, or calculated in real-time via the system controller as a function of wire displacement and the filler wire's spring constant factor. As per the latter, the corrective force may be calculated as:

$$F = F_{JOINT} - F_{OPTIC} = k_{wire} \cdot d_{meas}$$

where $F_{JOINT}$ is a reaction force applied to the filler wire by the joint region of the workpiece(s) into which the filler wire is discharged by the wire feeder; $F_{OPTIC}$ is the corrective force to be applied to the filler wire by pivoting of the processing head; $k_{wire}$ is the spring constant factor of the filler wire; and $d_{meas}$ is the wire displacement. In instances where the workpiece processing system is calibrated with a threshold displacement range, upon determining that the wire displacement is greater than the high threshold displacement value, a first (high) corrective force may be calculated. On the other hand, if the wire displacement is less than the high threshold displacement value, but is greater than the low threshold displacement value, a second (low) corrective force distinct from the first corrective force may be calculated.

As seen in the inset view of FIG. 2, the reaction force $F_{JOINT}$ is applied via the joint region 17 to a distal end of the filler wire 44 in a first transverse direction (upward in the figures) with respect to the direction of travel $D_{LASER}$ of the laser welding head 16. To counteract this force, the corrective force $F_{OPTIC}$ is applied via the feeder nozzle 46 of the wire feeder 28 to a lateral side of the filler wire 44 in a second transverse direction (downward in the figures), opposite that of the reaction force $F_{JOINT}$. It may be desirable, for at least some implements, to set a maximum "saturation" limit for any counteracting corrective force output via the laser welding head 16. In this instance, the determined corrective force $F_{OPTIC}$ applied by the laser welding head 16 through the feeder nozzle 46 to the filler wire 44 may be restricted to being less than or equal to this memory-stored saturation limit.

With continuing reference to FIG. 3, the system controller transmits one or more command signals to the processing head actuator to pivot the processing head to thereby apply the corrective force to the filler wire as the filler wire is discharged from the wire feeder, as indicated at process block 211. When applied by the robotic LBW system 10 of FIG. 1, for example, the servomotor 24 drivingly attached to the laser welding head 16 receives command signal(s) $s_{comm}$ from the robot weld controller 14. These signals $s_{comm}$ may include an angular position or a sequence of angular positions for the servomotor's output shaft. In so doing, the servomotor 24 pivots the laser welding head 16 and, thus, the wire feeder 28 and feeder nozzle 46 mounted thereto in a side-to-side motion with respect to the welding head's direction of travel $D_{LASER}$. For at least some implementations, there may be four 16-bit inputs for communication between the robot weld controller 14 and the laser welding head 16. Using these inputs, laser head setup parameters and process parameters may be adjusted at a rate of up to approximately 20 Hz. One or more of these inputs may be set to allow the robot weld controller 14 to change the value of side force at a rate of 20 Hz.

In instances where the workpiece processing system is calibrated with a threshold displacement range, upon determining that the wire displacement is greater than the high threshold displacement value, the system controller responsively transmits a first command signal to pivot the processing head a first angular distance to thereby apply the high corrective force to the filler wire. On the other hand, if the wire displacement is less than the high threshold displacement value but greater than the low threshold displacement value, the system controller transmits a second command signal to pivot the processing head a second angular distance to thereby apply the low corrective force to the filler wire. During the welding/brazing operation, as the monitoring system tracks the digital inputs triggered by a quality monitor module, if the LOW limit is triggered, the robot weld controller 14 may add a value of 50 to the side force output via the laser head 16. If a HIGH limit is triggered, robot weld controller 14 may subtract 50 from the side force output via the laser head 16.

Method 200 moves from process block 211 to process block 213 to check the adjusted positioning of the filler wire. That is, the digital camera 30 and image recognition module 104 of FIG. 2 cooperatively detect and locate a new wire location corresponding to a lateral edge at a distal end of the moved filler wire 44. Then, at decision block 215, method 200 ascertains whether or not a new wire displacement corresponding to the new wire location is less than the desired displacement value $d_{des}$. If not (Block 215=NO), the method 200 may loop back to process block 203 and iterate through the control operations subsequent thereto. On the other hand, if it is determined that the new wire location is less than the desired displacement value $d_{des}$ (Block 215=YES), the method 200 shifts to terminal block 217. Once the foregoing measures are completed, the method 200 of FIG. 3 may advance to terminal block 217 and terminate, or may loop back to terminal block 201 and run in a continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for operating a non-autogenous workpiece processing system, the workpiece processing system including a system controller, a pivotable processing head bearing a wire feeder operable to discharge filler wire and a beam emitter operable to melt the filler wire, and an actuator operable to selectively pivot the processing head, the method comprising:
  receiving, via the system controller from a position sensor, sensor signals indicative of a wire location of the filler wire discharged into a joint region by the wire feeder;
  determining, via the system controller based on the received sensor signals, a wire displacement between the wire location and a beam location of a beam emitted onto the joint region by the beam emitter;
  determining, via the system controller, if the wire displacement is greater than a threshold wire displacement value;
  determining, via the system controller responsive to the wire displacement being greater than the threshold wire displacement value, a corrective force calculated to reduce the wire displacement to below the threshold wire displacement value; and
  transmitting, via the system controller to the actuator, a command signal to pivot the processing head to thereby apply the corrective force to the filler wire as the filler wire is discharged from the wire feeder.

2. The method of claim 1, wherein the corrective force is calculated via the system controller as a function of the wire displacement and a spring constant factor of the filler wire.

3. The method of claim 2, wherein the corrective force is calculated as:

$$\Sigma F = F_{JOINT} - F_{OPTIC} = k_{wire} \cdot d_{meas}$$

where $F_{JOINT}$ is a reaction force applied to the filler wire by the joint region between two workpieces into which the filler wire is discharged by the wire feeder; $F_{OPTIC}$ is the corrective force applied to the filler wire by the pivoting of the processing head; $k_{wire}$ is the spring constant factor of the filler wire; and $d_{meas}$ is the wire displacement.

4. The method of claim 3, wherein the reaction force is applied via the joint region to a distal end of the filler wire in a first transverse direction, and the corrective force is applied via a feeder nozzle of the wire feeder to a lateral side of the filler wire in a second transverse direction.

5. The method of claim 1, further comprising:
  determining, via the system controller based on the received sensor signals, a lateral edge of the wire, the lateral edge being set as the wire location; and
  determining, via the system controller based on the received sensor signals, a beam center of the beam, the beam center being set as the beam location,
  wherein determining the wire displacement includes measuring a distance between the lateral edge of the wire and the beam center of the beam.

6. The method of claim 1, wherein determining if the wire displacement is greater than the threshold wire displacement value includes:

determining if the wire displacement is greater than a first threshold displacement value; and determining if the wire displacement is less than the first threshold displacement value and greater than a second threshold displacement value less than the first threshold displacement value.

7. The method of claim 6, wherein determining the corrective force calculated to reduce the wire displacement to below the threshold wire displacement value includes:

determining, responsive to the wire displacement being greater than the first threshold displacement value, a first corrective force; and determining, responsive to the wire displacement being greater than the second threshold displacement value and less than the first threshold displacement value, a second corrective force distinct from the first corrective force.

8. The method of claim 7, wherein transmitting the command signal to the actuator includes:

transmitting, responsive to determining the first corrective force, a first command signal to pivot the processing head a first angular distance to thereby apply the first corrective force to the filler wire; and transmitting, responsive to determining the second corrective force, a second command signal to pivot the processing head a second angular distance to thereby apply the second corrective force to the filler wire.

9. The method of claim 1, further comprising transmitting, via the system controller to the actuator, a series of command signals to pivot the processing head in a sequence of angular distances of a predetermined welding and/or brazing operation, wherein the command signal adds to or subtracts from one or more of the angular distances of the processing head during the predetermined welding and/or brazing operation.

10. The method of claim 1, further comprising determining a saturation limit for the actuator, wherein the determined corrective force applied by the processing head to the filler wire is limited to being less than or equal to the saturation limit.

11. The method of claim 1, wherein the beam emitter includes a welding/brazing laser assembly and the beam includes a laser beam, the method further comprising setting, via the system controller in a resident memory device, a calibrated beam spot location of the laser beam, wherein the beam location is the calibrated beam spot location.

12. The method of claim 1, wherein the actuator includes a servomotor drivingly attached to the processing head, and wherein the command signal transmitted via the system controller includes an angular position for an output shaft of the servomotor.

13. The method of claim 1, wherein the position sensor includes a digital camera module mounted to the processing head and configured to capture real-time images of the filler wire discharged from the wire feeder, and wherein the sensor signals include the real-time images of the filler wire.

14. An automated non-autogenous workpiece processing system comprising:

a processing head with a support frame configured to pivotably mount to a support structure, a wire feeder mounted on the support frame and operable to discharge filler wire, and a beam emitter mounted on the support frame and operable to melt the filler wire;

an actuator drivingly attached to the support frame and operable to selectively pivot the processing head; and a system controller communicatively connected to the actuator and the processing head, the system controller being programmed to:

receive sensor signals from a position sensor indicative of a wire location of the filler wire discharged into a joint region by the wire feeder;

determine, based on the received sensor signals, a wire displacement between the wire location and a beam location of a beam emitted onto the joint region by the beam emitter;

determine if the wire displacement is greater than a threshold wire displacement value;

responsive to the wire displacement being greater than the threshold wire displacement value, determine a corrective force calculated to reduce the wire displacement to below the threshold wire displacement value; and transmit a command signal to the actuator to pivot the processing head such that the processing head applies the corrective force to the filler wire as the filler wire is discharged from the wire feeder.

15. The workpiece processing system of claim 14, wherein the corrective force is calculated via the system controller as a function of the wire displacement and a spring constant factor of the filler wire.

16. The workpiece processing system of claim 15, wherein the corrective force is calculated as:

$$\Sigma F = F_{JOINT} - F_{OPTIC} = k_{wire} \cdot d_{meas}$$

where $F_{JOINT}$ is a reaction force applied to the filler wire by the joint region between two workpieces into which the filler wire is discharged by the wire feeder; $F_{OPTIC}$ is the corrective force applied to the filler wire by the pivoting of the processing head; $k_{wire}$ is the spring constant factor of the filler wire; and $d_{meas}$ is the wire displacement.

17. The workpiece processing system of claim 16, wherein the reaction force is applied via the joint region to a distal end of the filler wire in a first transverse direction, and the corrective force is applied via a feeder nozzle of the wire feeder to a lateral side of the filler wire in a second transverse direction.

18. The workpiece processing system of claim 14, wherein the system controller is further programmed to:

determine, based on the received sensor signals, a lateral edge of the wire, the lateral edge being set as the wire location; and determine, based on the received sensor signals, a beam center of the beam, the beam center being set as the beam location, wherein determining the wire displacement includes measuring a distance between the lateral edge of the wire and the beam center of the beam.

19. The workpiece processing system of claim 14, wherein the system controller is further programmed to transmit a series of command signals to the actuator to pivot the processing head in a sequence of angular distances of a predetermined welding and/or brazing operation, wherein the command signal adds to or subtracts from one or more of the angular distances of the processing head during the predetermined welding and/or brazing operation.

20. The workpiece processing system of claim 14, wherein the beam emitter includes a welding/brazing laser assembly, the beam includes a laser beam, the actuator includes a servomotor drivingly attached to the support frame, and the position sensor includes a digital camera module mounted to the processing head.

* * * * *